US012604165B2

(12) United States Patent
Ikushima

(10) Patent No.: US 12,604,165 B2
(45) Date of Patent: Apr. 14, 2026

(54) COMMUNICATION CONTROL METHOD AND COMMUNICATION DEVICE

(71) Applicant: DENSO CORPORATION, Kariya-city (JP)

(72) Inventor: Keisuke Ikushima, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 114 days.

(21) Appl. No.: 18/329,180

(22) Filed: Jun. 5, 2023

(65) Prior Publication Data

US 2023/0319530 A1    Oct. 5, 2023

Related U.S. Application Data

(63) Continuation of application No. PCT/JP2021/040414, filed on Nov. 2, 2021.

(30) Foreign Application Priority Data

Dec. 8, 2020    (JP) ................................. 2020-203695

(51) Int. Cl.
H04W 4/48          (2018.01)
H04W 12/06       (2021.01)
(52) U.S. Cl.
CPC ............. *H04W 4/48* (2018.02); *H04W 12/06* (2013.01)
(58) Field of Classification Search
CPC ......... H04W 4/48; H04W 12/06; H04W 4/44; H04W 12/069; G06F 21/606; G06F 21/44; H04L 63/10; H04L 67/53; H04L 12/40032; H04L 2012/40273
See application file for complete search history.

(56) References Cited

U.S. PATENT DOCUMENTS

| | | | | |
|---|---|---|---|---|
| 10,091,650 B2 * | 10/2018 | Li | ........................ | H04L 63/0853 |
| 2014/0309919 A1 | 10/2014 | Ricci | | |
| 2015/0326529 A1 * | 11/2015 | Morita | ................ | G06F 21/6218 |
| | | | | 726/12 |
| 2015/0372975 A1 | 12/2015 | Moriya et al. | | |
| 2016/0057122 A1 * | 2/2016 | van Bergeijk | ........ | H04W 12/04 |
| | | | | 713/168 |
| 2016/0248816 A1 | 8/2016 | Nakahara | | |
| 2020/0211301 A1 * | 7/2020 | Zhang | ................... | H04L 63/065 |
| 2020/0259919 A1 | 8/2020 | Lepp et al. | | |
| 2022/0217534 A1 * | 7/2022 | Kosugi | ............... | H04W 12/033 |

FOREIGN PATENT DOCUMENTS

| | | |
|---|---|---|
| JP | 2014165641 A | 9/2014 |
| JP | 2016158091 A | 9/2016 |

* cited by examiner

*Primary Examiner* — Marcus Smith
*Assistant Examiner* — Raenita Ann Fenner
(74) *Attorney, Agent, or Firm* — Harness, Dickey & Pierce, P.L.C.

(57)          ABSTRACT

By a communication control method or a communication device for controlling a vehicle exterior communication performed between an in-vehicle electronic control unit and an outside of a vehicle, connection information necessary for the vehicle exterior communication between the in-vehicle electronic control unit and a specific connection destination is prepared, and the in-vehicle electronic control unit is permitted to perform the vehicle exterior communication limited to the specific connection destination using the connection information.

13 Claims, 9 Drawing Sheets

Figure 7:
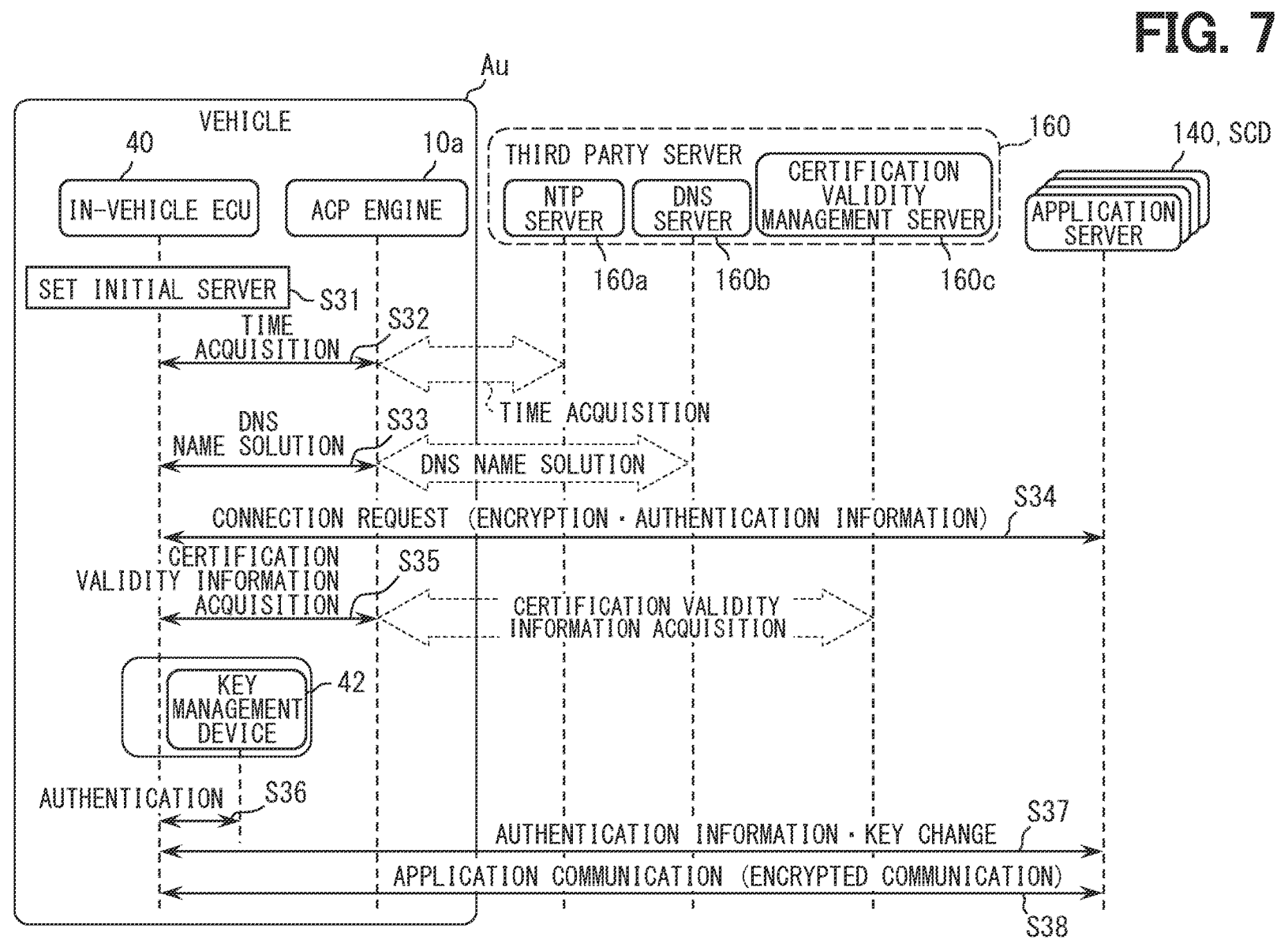

140, SGD

160

160c

160b

160a

APPLICATION SERVER

THIRD PARTY SERVER

CERTIFICATION VALIDITY MANAGEMENT SERVER

DNS SERVER

NTP SERVER

Au

10a

VEHICLE

ACP ENGINE

40

IN-VEHICLE ECU

SET INITIAL SERVER    S31

S32    TIME ACQUISITION

TIME ACQUISITION

S33    DNS NAME SOLUTION

DNS NAME SOLUTION

CONNECTION REQUEST (ENCRYPTION · AUTHENTICATION INFORMATION)    S34

S35    CERTIFICATION VALIDITY INFORMATION ACQUISITION

CERTIFICATION VALIDITY INFORMATION ACQUISITION

42

KEY MANAGEMENT DEVICE

AUTHENTICATION    S36

AUTHENTICATION INFORMATION · KEY CHANGE    S37

APPLICATION COMMUNICATION (ENCRYPTED COMMUNICATION)    S38

COMMUNICATION CONTROL METHOD AND COMMUNICATION DEVICE

CROSS REFERENCE TO RELATED APPLICATIONS

The present application is a continuation application of International Patent Application No. PCT/JP2021/040414 filed on Nov. 2, 2021, which designated the U.S. and claims the benefit of priority from Japanese Patent Application No. 2020-203695 filed on Dec. 8, 2020. The entire disclosures of all of the above applications are incorporated herein by reference.

TECHNICAL FIELD

The disclosure according to this specification relates to an information transmission method and a communication device for controlling vehicle exterior communication of an in-vehicle ECU.

BACKGROUND

In comparative example, an information process device is capable of performing a vehicle exterior communication between an electronic control unit mounted on a vehicle and an external network. In the information process device of the comparative example, a proxy unit performs the vehicle exterior communication between the electronic control unit and the external network, and therefore it is possible to preferably ensure a security.

SUMMARY

By a communication control method or a communication device for controlling a vehicle exterior communication performed between an in-vehicle electronic control unit and an outside of a vehicle, connection information necessary for the vehicle exterior communication between the in-vehicle electronic control unit and a specific connection destination is prepared, and the in-vehicle electronic control unit is permitted to perform the vehicle exterior communication limited to the specific connection destination using the connection information.

BRIEF DESCRIPTION OF DRAWINGS

FIG. 2 is a sequence diagram showing details of a synchronization process for synchronizing an ACP (Automotive Communication Platform) engine with an ACP cloud.

FIG. 7 is a sequence diagram showing details of a connection process according to the third embodiment.

DESCRIPTION OF EMBODIMENTS

Figure 1:
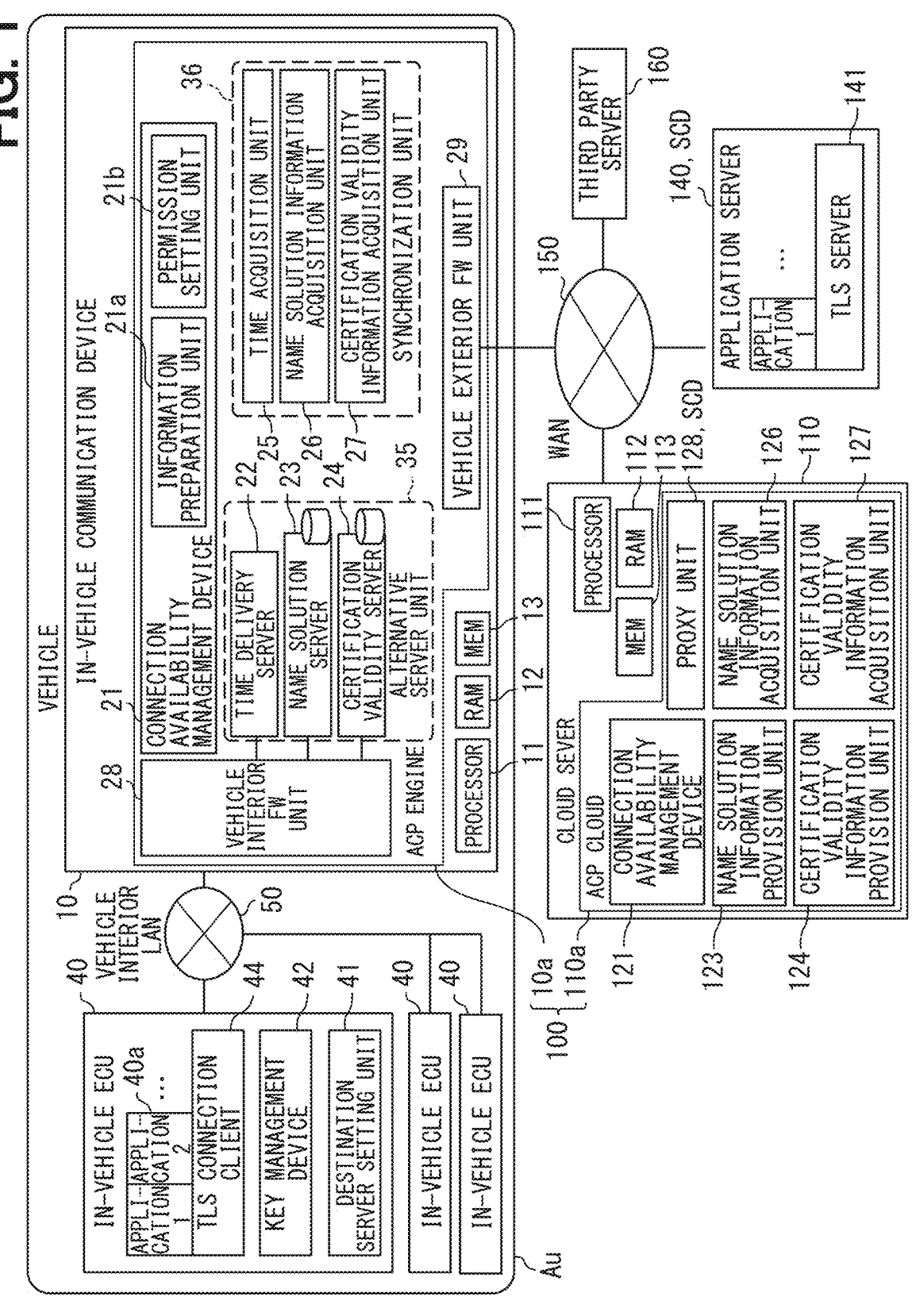
FIG. 1 is a diagram showing an overview of a communication process system according to a first embodiment of the present disclosure.

It is difficult to ensure a processing performance of the proxy unit mounted on the vehicle of the comparative example. Therefore, even when the proxy unit ensures a security standard of the vehicle exterior communication, the proxy unit becomes a bottleneck, and it becomes difficult to ensure the network performance of the vehicle exterior communication.

One example of the present disclosure provides a communication control method and a communication device capable of ensuring both of a network performance and a security standard.

One example embodiment of the present disclosure provides a communication control method that is used for controlling a vehicle exterior communication performed between an in-vehicle electronic control unit and an outside of a vehicle and is executed by at least one processor. The method includes: preparing connection information necessary for the vehicle exterior communication between the in-vehicle electronic control unit and a specific connection destination on behalf of the in-vehicle electronic control unit; and permitting the in-vehicle electronic control unit to perform the vehicle exterior communication limited to the specific connection destination using the connection information.

Further, another example embodiment of the present disclosure provides a communication control device for controlling a vehicle exterior communication performed between an in-vehicle electronic control unit and an outside of a vehicle. The device includes: an information preparation unit that prepares connection information necessary for the vehicle exterior communication between the in-vehicle electronic control unit and a specific connection destination on behalf of the in-vehicle electronic control unit; and a permission setting unit that permits the in-vehicle electronic control unit to perform the vehicle exterior communication limited to the specific connection destination using the connection information.

In these embodiments, it is possible to prepare and provide connection information necessary for external communication to a specific connection destination. Therefore, the in-vehicle ECU can perform the vehicle exterior communication with the specific connection destination by using the prepared connection information without performing vehicle exterior communication with the connection destination whose reliability is not sufficiently ensured. Accordingly, it is possible to achieve both network performance and security standard.

Hereinafter, multiple embodiments of the present disclosure will be described with reference to the drawings. In the following description, the same reference symbols are assigned to corresponding components in each embodiment in order to avoid repetitive descriptions. In each of the embodiments, when only a part of the configuration is described, the remaining parts of the configuration may adopt corresponding parts of other embodiments. In addition to the combinations of configurations specifically shown in various embodiments, the configurations of various embodiments can be partly combined even if not explicitly suggested, unless such combinations are contradictory. Combinations of the embodiments and modifications that are not explicitly described are also deemed to be disclosed by the present disclosure.

First Embodiment

As shown in FIG. 1, a communication process system according to a first embodiment of the present disclosure enables a secure vehicle exterior communication by an in-vehicle ECU 40, by controlling the vehicle exterior communication between a communication network outside a vehicle Au and the in-vehicle ECU 40. The communication process system employs an automotive wireless communication platform 100 including an ACP cloud 110a and an ACP engine 10a. The automotive wireless communication platform 100 implements a pseudo-always-on connection as if all the in-vehicle ECUs 40 were always connected to the network outside the vehicle for each vehicle Au. Hereinafter, details of a cloud system, an in-vehicle system, and the like, which constitute the communication processing system, will be described in order.

The cloud system is a configuration group provided outside the vehicle Au among communication process systems. The cloud system includes an application server 140, a third party server 160, and a cloud server 110. The application server 140, the third party server 160, and the cloud server 110 are each communicably connected to a WAN (Wide Area Network) 150, which is a communication network outside the vehicle.

The application server 140 becomes a substantial connection destination of the in-vehicle ECU 40. The application server 140 performs application communication with the in-vehicle ECU 40. In the first embodiment, a proxy unit 128, which will be described later, relays the application communication between the application server 140 and the in-vehicle ECU 40. The application server 140 has a TLS (Transport Layer Security) server 141. The TLS server 141 cooperates with the in-vehicle ECU 40 (TLS connection client 44 to be described later) and executes a process related to TLS construction. The TLS construction enables encrypted application communication between the in-vehicle ECU 40 and the application server 140.

Figure 2:
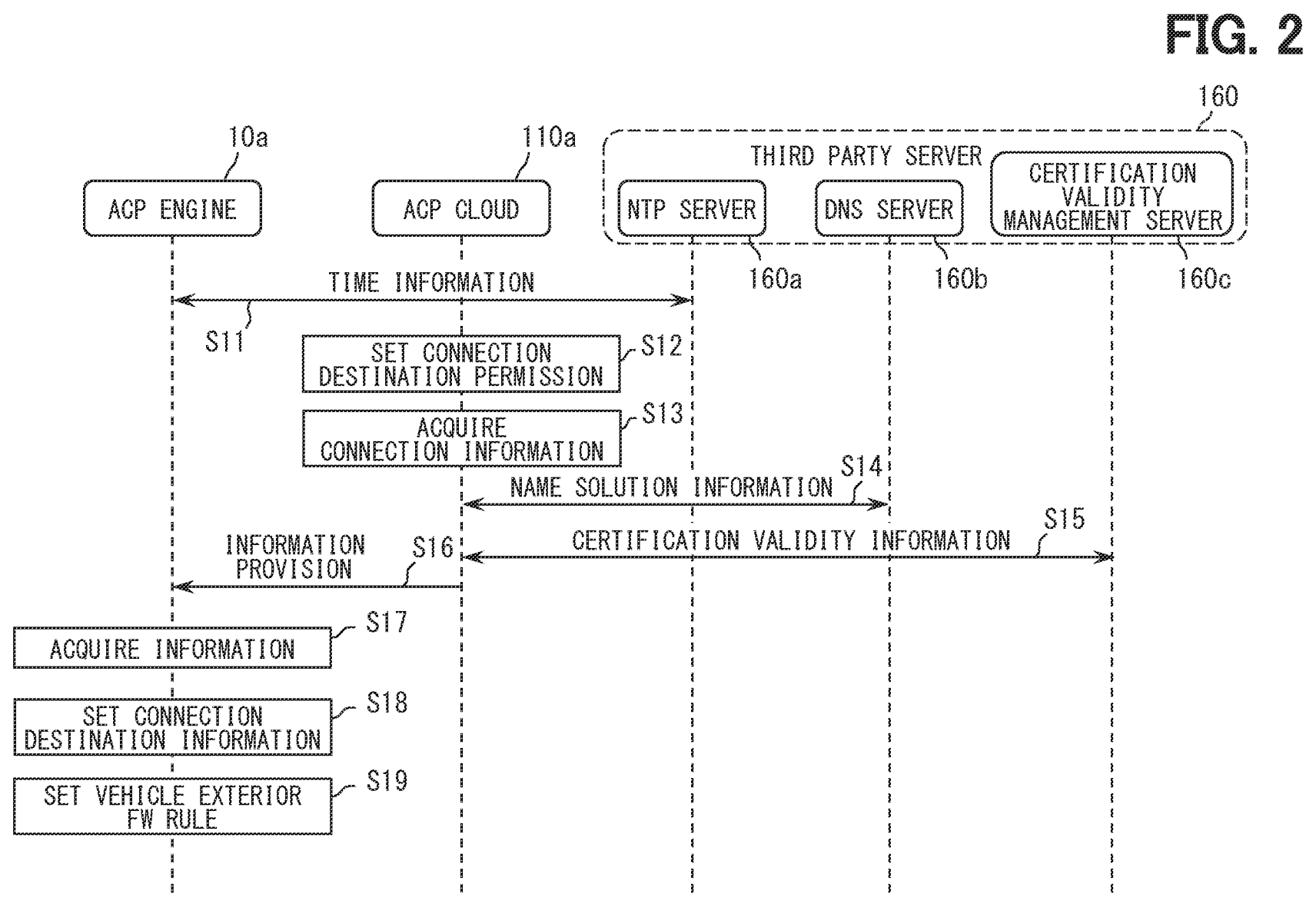

The third party server 160 is, for example, an NTP (Network Time Protocol) server 160a, a DNS (Domain Name System) server 160b, a certification validity management server 160c, and the like (see FIG. 2). The NTP server 160a is a server device that delivers time information indicating the current time to other nodes. The DNS server 160b is a server device that provides name solution information to other nodes. Specifically, the DNS server 160b returns an IP address (for example, 123.23.123.123) linked to the domain name (for example, Abc.com) as name solution information to a transmission source of the domain name. The certification validity management server 160c is a server device that provides certification validity information to other nodes. An administrator who manages the NTP server 160a, the DNS server 160b, and the certification validity management server 160c is an administrator (third party) different from an administrator who manages the cloud server 110.

The cloud server 110 is connected to multiple application servers 140 via the WAN 150. The cloud server 110 can exchange information with an in-vehicle communication device 10 mounted on the vehicle Au by wireless communication via a mobile communication network. The cloud server 110 can communicate with the in-vehicle communication device 10 not only by a mobile phone line such as a mobile communication network, but also by wireless communication such as Wi-Fi (registered trademark) and V2X. In the cloud server 110, the ACP cloud 110a that implements cloud functions for the cloud of the automotive wireless communication platform 100 operates. The ACP cloud 110a acquires at least a part of the information (hereinafter referred to as connection information) necessary for accessing the application server 140 from the in-vehicle ECU 40, and provides the acquired connection information to the in-vehicle communication device 10.

The in-vehicle communication device 10 connected to the cloud server 110 via the WAN 150 may be plural. That is, the cloud server 110 selects one or more vehicles Au from a large number of vehicles Au, and provides connection information to the in-vehicle communication device 10 mounted on the vehicle Au. Reliability such as security of the cloud server 110 tends to be ensured more than reliability of the application server 140 and the third party server 160. This is because security development is carried out in consideration of a vehicle life cycle as a system integrated with the in-vehicle communication device 10 in a development process of the vehicle Au.

The cloud server 110 is a calculation process device that mainly includes a processor 111, a RAM 112, a storage medium 113, and the like. The cloud server 110 implements the functions of the ACP cloud 110a by causing the processor 111 to execute programs stored in the storage medium 113. The cloud server 110 includes, as functional units of the ACP cloud 110a, a name solution information acquisition unit 126, a certification validity information acquisition unit 127, a name solution information provision unit 123, a certification validity information provision unit 124, a connection availability management unit 121, and the proxy unit 128.

The name solution information acquisition unit 126 acquires name solution information from the DNS server 160b. Specifically, the name solution information acquisition unit 126 acquires name solution information indicating a specific connection destination (hereinafter referred to as a specific connection destination) SCD that is permitted for each in-vehicle ECU 40. The certification validity information acquisition unit 127 acquires certification validity information from the certification validity management server 160c. Specifically, the certification validity information acquisition unit 127 acquires the certification validity information for the specific connection destination SCD.

The name solution information provision unit 123 provides the name solution information acquired by the name solution information acquisition unit 126 to the ACP engine 10a. The certification validity information provision unit 124 provides the certification validity information acquired by the certification validity information acquisition unit 127 to the ACP engine 10a.

Designation information for designating the specific connection destination SCD linked to each in-vehicle ECU 40 is set in the connection availability management unit 121. The designation information is set in the connection availability management unit 121 by a reliable administrator of the cloud server 110, a car manufacturer that provides the vehicle Au, a platformer of the automotive wireless communication platform 100, or the like. The connection availability management unit 121 causes the name solution information acquisition unit 126 and the certification validity information acquisition unit 127 to acquire the connection information for the specific connection destination SCD based on the destination information. The connection availability management unit 121 provides the name solution information and the certification validity information to the ACP engine 10a through the name solution information provision unit 123 and the certification validity information provision unit 124, and causes synchronization of the connection information between the ACP cloud 110a and the ACP engine 10a. The connection availability management unit 121 manages the connection information shared between the ACP cloud 110a and the ACP engine 10a.

The proxy unit 128 is set to the specific connection destination SCD in the first embodiment. The in-vehicle ECU 40 communicates with the proxy unit 128 as a proxy for the application server 140. The proxy unit 128 authenticates the in-vehicle ECU 40, and enables the proxy unit 128 to connect to the application server 140 instead of the authenticated in-vehicle ECU 40. The in-vehicle ECU 40 can transmit and receive data to and from the application server 140 only via the proxy unit 128. According to such an authentication process, it becomes unnecessary to disclose the process method for authenticating whether the vehicle Au (in-vehicle ECU 40) is correct to an application server developer.

The in-vehicle system is a configuration group provided inside the vehicle Au among communication process systems. The in-vehicle system includes the in-vehicle communication device 10 and one or more in-vehicle ECUs 40. The in-vehicle communication device 10 and each in-vehicle ECU 40 are communicably connected to an in-vehicle LAN (Local Area Network) 50, which is an in-vehicle communication network. The vehicle interior LAN 50 is an IP network mainly including Ethernet (registered trademark) or the like. A part of the in-vehicle communication device 10 and the in-vehicle ECU 40 may be directly or indirectly connected to the vehicle interior LAN 50 in a connection form such as USB, for example.

The in-vehicle communication device 10 is called a TCU (Telematics Control Unit) or a DCM (Data Communication Module) or the like, and enables wireless communication between the in-vehicle system and the outside. The in-vehicle communication device 10 can maintain a wireless communication available state and maintain an online state where the in-vehicle communication device 10 is connected to the network, even when the main power source of the vehicle Au, specifically, the so-called ignition, is turned off, such as during parking, for example. In the in-vehicle communication device 10, an ACP engine 10a implementing the vehicle functions of the automotive wireless communication platform 100 operates. The ACP engine 10a limits the specific connection destination SCD, that permits the end ECU (in-vehicle ECU 40) to perform the vehicle exterior communication, to the proxy unit 128 (or the application server 140).

The in-vehicle communication device 10 is a control device that mainly includes a microcontroller having a processor 11, a RAM 12, a storage medium 13, and the like. The in-vehicle communication device 10 implements the functions of the ACP engine 10a by causing the processor 11 to execute a program (communication control program) stored in the storage medium 13. The in-vehicle communication device 10 includes a connection availability management unit 21, a synchronization unit 36, an alternative server unit 35, a vehicle interior FW unit 28, and a vehicle exterior FW unit 29 as functional units of the ACP engine 10a.

The connection availability management unit 21 manages the connection destination of each in-vehicle ECU 40. The connection availability management unit 21 cooperates with the connection availability management unit 121 of the ACP cloud 110a to synchronize information related to the specific connection destination SCD. Thereby, the connection availability management unit 21 enables the ACP cloud 110a outside the vehicle to set and manage the specific connection destination SCD, to which each in-vehicle ECU 40 is permitted to connect. The connection availability management unit 21 includes an information preparation unit 21a and a permission setting unit 21b as sub-function units.

The information preparation unit 21a prepares connection information necessary for the vehicle exterior communication between the in-vehicle ECU 40 and the specific connection destination SCD on behalf of the in-vehicle ECU 40. The information preparation unit 21a cooperates with the synchronization unit 36 and acquires connection information through the vehicle exterior communication. The information preparation unit 21a may acquire the connection information from the ACP cloud 110a or directly from the third party server 160. The information preparation unit 21a of the first embodiment obtains the name solution information and the certification validity information from the ACP cloud 110a, and obtains the time information from the NTP server 160a. The information preparation unit 21a sets the connection information acquired by the synchronization unit 36 in the alternative server unit 35.

The permission setting unit 21b permits the in-vehicle ECU 40 to perform the vehicle exterior communication limited to the specific connection destination SCD using the connection information prepared by the information preparation unit 21a. The permission setting unit 21b performing setting of the in-vehicle ECU 40 (destination server setting unit 41) so that the connection information is acquired from the alternative server unit 35 instead of the third party server 160 outside the vehicle. The permission setting unit 21b identifies a connection destination outside the vehicle to which the in-vehicle ECU 40 is permitted to connect using the name solution information. The name solution information is the IP address of the specific connection destination SCD, and also serves as designation information for designating the specific connection destination SCD linked to the in-vehicle ECU 40. The permission setting unit 21b of the first embodiment permits the in-vehicle ECU 40 only to connect to the proxy unit 128.

Specifically, the permission setting unit 21b restricts responses to access for the name solution from the in-vehicle ECU 40 to the ACP engine 10a. The permission setting unit 21b does not respond with the IP address of the proxy unit 128 and information related to its connection only to a domain name of the application server 140 that permits data transmission or reception with the in-vehicle ECU 40 or the proxy unit 128. The information related to the connection here includes a public key that enables the proxy unit 128 to decrypt the packet encrypted for preventing eavesdropping of the request packet at the time of requesting connection to the proxy unit 128. The permission setting unit 21b cooperates with the vehicle exterior FW unit 29 to allow only the communication addressed to the proxy unit 128 to pass through the vehicle exterior communication by the in-vehicle ECU 40.

The synchronization unit 36 cooperates with the connection availability management unit 21 to synchronize the ACP engine 10a and the ACP cloud 110a, in other words, to share information between the ACP engine 10a and the third party server 160. The synchronization unit 36 includes a time acquisition unit 25, a name solution information acquisition unit 26, and a certification validity information acquisition unit 27 as sub-function units. The time acquisition unit 25 acquires time information by synchronizing with the NTP server 160a that is the third party server 160. The name solution information acquisition unit 26 acquires the name solution information by synchronizing with the name solution information acquisition unit 126 of the ACP cloud 110*a*. The certification validity information acquisition unit 27 acquires the certification validity information by synchronizing with the certification validity information acquisition unit 127 of the ACP cloud 110*a*.

The alternative server unit 35 provides the connection information to the in-vehicle ECU 40 instead of the third party server 160. The alternative server unit 35 acts as a proxy for exchanging signals with each third party server 160 among procedures necessary for secure connection to the outside of the vehicle by the in-vehicle ECU 40, and responds to requests from the in-vehicle ECU 40 instead of each third party server 160.

The alternative server unit 35 includes a time delivery server 22, a name solution server 23, and a certification validity management server 24 as sub-functional units. The time delivery server 22 holds the time information acquired by the time acquisition unit 25. In response to a request from the in-vehicle ECU 40, the time delivery server 22 synchronizes the time information with the in-vehicle ECU 40 instead of the NTP server 160*a*. The name solution server 23 holds the name solution information acquired by the name solution information acquisition unit 26. The name solution server 23 synchronizes the name solution information with the in-vehicle ECU 40 instead of the DNS server 160*b* in response to a request from the in-vehicle ECU 40. The certification validity management server 24 holds the certification validity information acquired by the certification validity information acquisition unit 27. In response to a request from the in-vehicle ECU 40, the certification validity management server 24 synchronizes the certification validity information with the in-vehicle ECU 40 instead of the certification validity management server 160*c*.

An in-vehicle FW (Firewall) unit 28 is provided at a connection portion with the vehicle interior LAN 50 in the ACP engine 10*a*. Communication between the ACP engine 10*a* and the vehicle interior LAN 50 always passes through the vehicle interior FW unit 28. The vehicle interior FW unit 28 determines vehicle interior communication from the vehicle interior LAN 50 to the ACP engine 10*a* and vehicle interior communication from the ACP engine 10*a* to the vehicle interior LAN 50, and cuts off the communication determined to be illegal based on a predetermined standard.

The vehicle exterior FW unit 29 is provided at a connection portion with the WAN 150 in the ACP engine 10*a*. Communication between the ACP engine 10*a* and the WAN 150 always passes through the vehicle exterior FW unit 29. The vehicle exterior FW unit 29 cuts off communication determined to be illegal based on a predetermined standard among the vehicle exterior communication between the in-vehicle system and the WAN 150. The vehicle exterior FW unit 29 can limit the vehicle exterior communication from the in-vehicle ECU 40 to the WAN 150. Specifically, the vehicle exterior FW unit 29 limits the connection destinations, with which the in-vehicle ECU 40 can perform the vehicle exterior communication, to only the specific connection destination SCD. In one example, the vehicle exterior FW unit 29 uses the IP address of the name solution information acquired from the permission setting unit 21*b* to limit the accessible connection destination to the proxy unit 128 (or the application server 140) according to the minimum restriction rule.

Some of the multiple in-vehicle ECUs 40 constituting the in-vehicle system may not need to use the mechanism of the ACP engine 10*a* that controls the vehicle exterior communinication. Since the IP address is different for each in-vehicle ECU 40, the ACP engine 10*a* can distinguish between the in-vehicle ECU 40 to which the mechanism for controlling the vehicle exterior communication is applied and the in-vehicle ECU 40 to which the mechanism is not applied. Further, in a case of a system configuration in which an application can be uniquely identified by a port number, the ACP engine 10*a* can identify applicable applications and non-applicable applications even on the in-vehicle ECU 40 with the same IP address. Therefore, the ACP engine 10*a* allows the in-vehicle ECU 40 to be applied and the in-vehicle ECU 40 not to be applied to coexist in the in-vehicle system.

The in-vehicle ECU 40 is a control device mounted on the vehicle Au, and mainly includes a microcontroller. The in-vehicle ECU 40 corresponds to an end ECU in an in-vehicle system. The in-vehicle ECU 40 may be any of a body system ECU, a vehicle control system ECU, an ADAS system or automated driving system ECU, and an HMI system ECU. The in-vehicle ECU 40 can execute one or more applications 40*a*. The application 40*a* provides various services to the user of the vehicle Au by performing application communication with the application server 140. Unlike the in-vehicle communication device 10, the in-vehicle ECU 40 is basically turned off in order to reduce power consumption when the power source of the vehicle Au is turned off.

The application 40*a* may not be installed in some of the in-vehicle ECUs 40. Further, the in-vehicle communication device 10 may be provided in an in-vehicle system as a configuration that also serves as the in-vehicle ECU 40, and may be capable of executing the application 40*a*.

The in-vehicle ECU 40 includes the destination server setting unit 41, a key management device 42, and the TLS connection client 44 as functional units that relay data between the ACP engine 10*a* and the application 40*a*. The destination server setting unit 41 sets the IP address of the ACP engine 10*a* as the synchronization destination of the time information, name solution information, and certification validity information. The key management device 42 is provided in the in-vehicle ECU 40 as a hardware independent configuration from other circuit units. The key management device 42 may be provided as a single IC, or may be a hardware configuration separated from other circuit units in one IC. The destination server setting unit 41 can perform independent management so that access to the key itself, calculation using the key, and the like can be performed only by specific means. The key management device 42 manages key information used for authentication of the specific connection destination SCD. The TLS connection client 44 uses the key information managed by the key management device 42 to authenticate whether the proxy unit 128, which is the specific connection destination SCD, is the qualified access destination. When authentication of the specific connection destination SCD (server authentication) and authentication of the in-vehicle ECU 40 by the server (client authentication) are completed, a secure connection between the in-vehicle ECU 40 and the proxy unit 128 is established.

Next, details of each process executed in the communication process system to implement the communication control method of the present disclosure will be described based on FIGS. 2 and 3 with reference to FIG. 1.

In a synchronization process shown in FIG. 2, synchronization between the ACP cloud 110*a* and the ACP engine 10a is performed. According to the synchronization process, the connection information is prepared in the ACP engine 10a.

In S11 of the synchronization process, time information is synchronized between the time acquisition unit 25 and the NTP server 160a. In S12, the ACP cloud 110a sets a specific connection destination SCD, for which connection is permitted for each in-vehicle ECU 40 of each vehicle Au, in the connection availability management unit 121 of the ACP cloud 110a. In S12, the ACP cloud 110a associates the designation information with each of the large number of in-vehicle ECUs 40, and designates the specific connection destination SCD for each in-vehicle ECU 40.

In S13, the connection availability management unit 121 acquires connection information. In S14, the name solution information is shared between the DNS server 160b and the name solution information acquisition unit 126. In S15, the certification validity information is shared between the certification validity management server 160c and the certification validity information acquisition unit 127. Instead of acquiring from the third party server 160, the administrator of the ACP cloud 110a may provide each connection information to the ACP cloud 110a.

In S16, the connection information is provided from the ACP cloud 110a to the ACP engine 10a. In S16, the ACP engine 10a acquires the connection information managed by the ACP cloud 110a through preset vehicle exterior communication with the ACP cloud 110a. In S17, the connection availability management unit 21 of the ACP engine 10a acquires connection information. According to S16 and S17, the name solution information and the certification validity information are synchronized between the name solution information provision unit 123 and the certification validity information provision unit 124, and the name solution information acquisition unit 26 and the certification validity information acquisition unit 27. The name solution information also serves as designation information linked to the in-vehicle ECU 40, and is the IP address of the specific connection destination SCD that permits the in-vehicle ECU 40 to perform the vehicle exterior communication.

In S18, the connection information acquired by the vehicle exterior communication in S11 and S16 is set in the alternative server unit 35. As described above, through vehicle interior communication, the alternative server unit 35 can provide the connection information to the in-vehicle ECU 40 via the vehicle interior LAN 50, without the vehicle exterior communication by the in-vehicle ECU 40. As a result, connection information necessary for the vehicle exterior communication with the specific connection destination SCD by the in-vehicle ECU 40 is prepared by the connection availability management unit 21 instead of the in-vehicle ECU 40.

In S19, the connection availability management unit 21 permits the in-vehicle ECU 40 to perform the vehicle exterior communication limited to the specific connection destination SCD using the connection information. In the first embodiment, the proxy unit 128 that relays the vehicle exterior communication from the in-vehicle ECU 40 to the application server 140 is set as the specific connection destination SCD of the in-vehicle ECU 40. In S19, a filtering setting of the vehicle exterior FW unit 29 is changed so that the vehicle exterior communication to the IP address indicated by the designation information is permitted.

Figure 3:
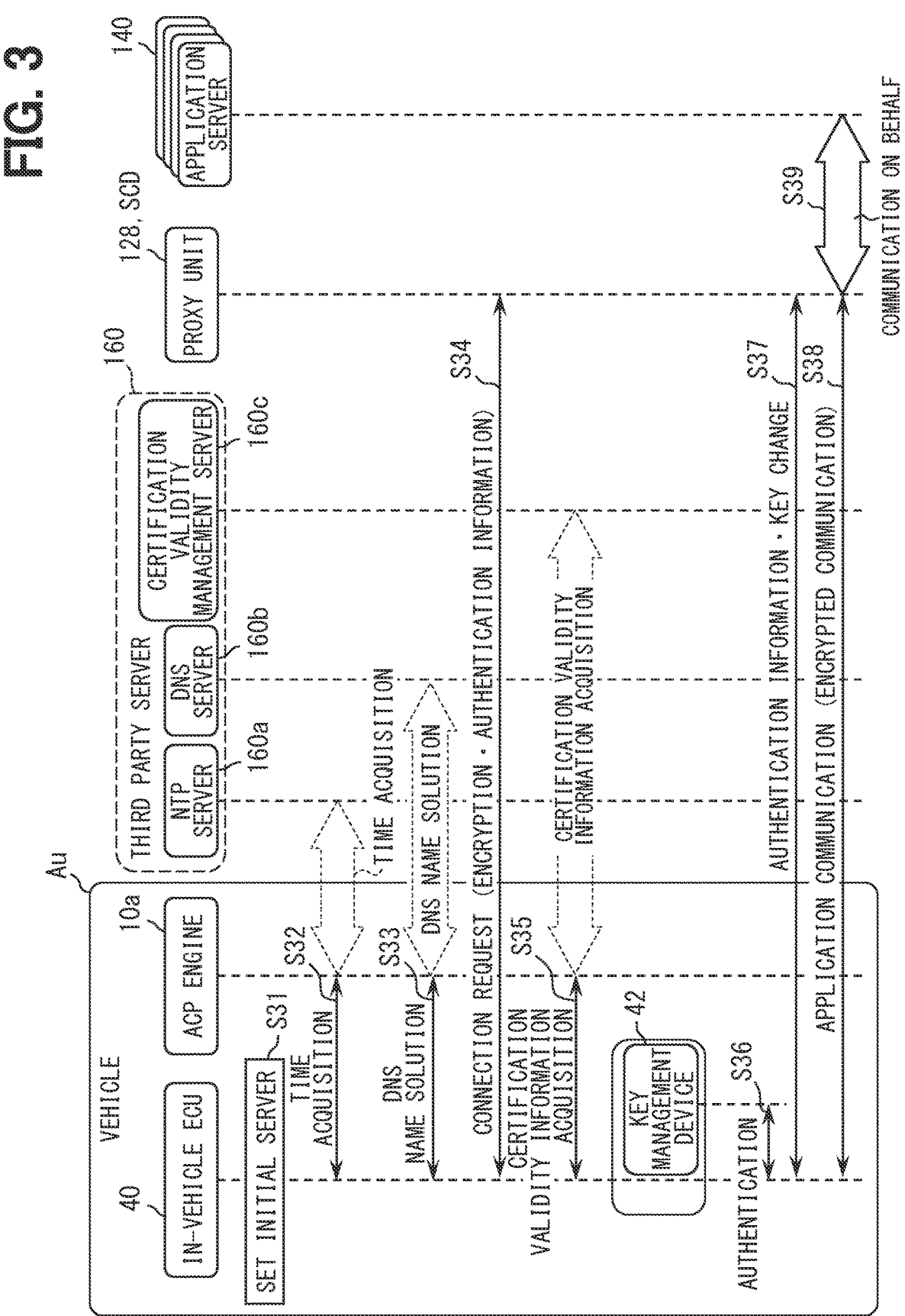
FIG. 3 is a sequence diagram showing details of a connection process for connecting an in-vehicle ECU to an application server.

In a connection process shown in FIG. 3, an encrypted communication path is constructed between the in-vehicle ECU 40 and the proxy unit 128. Only the in-vehicle ECU 40 and the proxy unit 128 that are mutually authenticated can grasp the content of the application communication flowing through the encrypted communication path. That is, the ACP engine 10a cannot grasp the content of application communication.

In S31, in an initial process in the in-vehicle ECU 40, the destination server setting unit 41 sets the access destination for acquiring connection information to the alternative server unit 35 of the ACP engine 10a.

In S32, the presence or absence of time information is grasped. When there is no time information, the time information is acquired by the vehicle interior communication to the time delivery server 22 of the ACP engine 10a. In S33, the name solution information is acquired by the vehicle interior communication to the name solution server 23 of the ACP engine 10a. Since each information is prepared in advance in the ACP engine 10a by the synchronization process, in S32 and S33, the vehicle exterior communication to the third party server 160 may not be performed (see broken line arrows).

In S34, a connection request to the proxy unit 128, so-called TLS negotiation, is performed. In S35, the certification validity management server 24 of the ACP engine 10a is checked for expiration of the certification validity information. In S35, the vehicle exterior communication to the third party server 160 may be omitted (see the broken line arrow). In S36, using the key information managed by the key management device 42, mutual authentication between the proxy unit 128, which is the specific connection destination SCD, and the in-vehicle ECU 40, that is, a server authentication process and client authentication process are executed. In S37, the authentication information and the key are exchanged. Thereby, the TLS construction between the in-vehicle ECU 40 and the proxy unit 128 is completed. At this time, a series of connection sequences for building TLS are completed between the proxy unit 128 and the application server 140. As a result, in S38 and S39, data transmission-reception between the application 40a on the in-vehicle ECU 40 and the corresponding application server 140 starts on the encrypted path between the in-vehicle ECU 40 and the proxy unit 128 and between the proxy unit 128 and the application server 140.

In the first embodiment described above, connection information necessary for the vehicle exterior communication to a specific connection destination SCD with sufficient reliability is prepared in the ACP engine 10a in advance, and can be provided from the ACP engine 10a to the in-vehicle ECU 40. Therefore, the in-vehicle ECU 40 does not have to perform the vehicle exterior communication with a connection destination whose reliability is not sufficiently ensured, specifically the third party server 160 or the application server 140 developed and provided by a third party. That is, the in-vehicle ECU 40 can perform the vehicle exterior communication with the specific connection destination SCD by using the connection information prepared in the ACP engine 10a. Accordingly, it is possible to achieve both network performance and security standard.

More specifically, in a comparative example in which an ECU having a proxy function (hereinafter referred to as a proxy ECU) replaces all vehicle exterior communication by the in-vehicle ECU, a processing capacity of an in-vehicle processor that performs proxy relay processing in the proxy ECU is particularly low. Thereby, throughput limitations and communication delays tend to occur. Even if we try to improve the comparative example so that the in-vehicle ECU can directly perform the vehicle exterior communication only with a proxy server on a reliable cloud, the secure connection with the proxy server on the reliable cloud requires connection to a third party server 160 having the insufficient reliability. On the other hand, in the above-described first embodiment, the ACP engine 10*a* can perform the vehicle exterior communication with the unreliable third party server 160 instead of the in-vehicle ECU 40, and provide the connection information necessary for the secure communication to the in-vehicle ECU 40. As a result, it is possible to eliminate the need for placement of the proxy ECU in the vehicle while eliminating connections with insufficient reliability, so that it is possible to ensure both the network performance and the security standard.

In addition, the in-vehicle communication device 10 of the first embodiment sets the connection information acquired by the vehicle exterior communication in the alternative server unit 35. Then, the alternative server unit 35 provides the connection information to the in-vehicle ECU 40 through the vehicle interior communication. In this way, when the connection information is prepared in the alternative server unit 35, it becomes possible to omit the vehicle exterior communication between the in-vehicle communication device 10 and the third party server 160 (see the broken line arrow in FIG. 3). Therefore, the in-vehicle ECU 40 can quickly start the vehicle exterior communication, and reduce the risk of an attack on the in-vehicle ECU 40 due to spoofing of the third party server 160.

Further, the ACP engine 10*a* of the first embodiment acquires connection information whose reliability is managed by the connection availability management unit 121 through the vehicle exterior communication with the preset ACP cloud 110*a*. According to the above, the further reduction of a risk is implemented.

Furthermore, the ACP engine 10*a* of the first embodiment acquires the name solution information from the ACP cloud 110*a* as the designation information for designating a specific connection destination SCD linked to the in-vehicle ECU 40. The connection availability management unit 21 changes the setting of the vehicle exterior FW unit 29 so that the vehicle exterior communication to the specific connection destination SCD indicated by the name solution information is permitted. According to the above, the connection destination permitted to the in-vehicle ECU 40 can be managed from the ACP cloud 110*a*.

In addition, in the first embodiment, the proxy unit 128 that relays the vehicle exterior communication is set as the specific connection destination SCD. Therefore, the connection destination of the in-vehicle ECU 40 is limited to the strictly managed ACP cloud 110*a*. According to the above, it is possible to further reduce the security risk caused by the application server 140. In the first embodiment, the ACP cloud 110*a* corresponds to a "connection management unit", and the in-vehicle communication device 10 corresponds to a "communication device".

Second Embodiment

Figure 4:
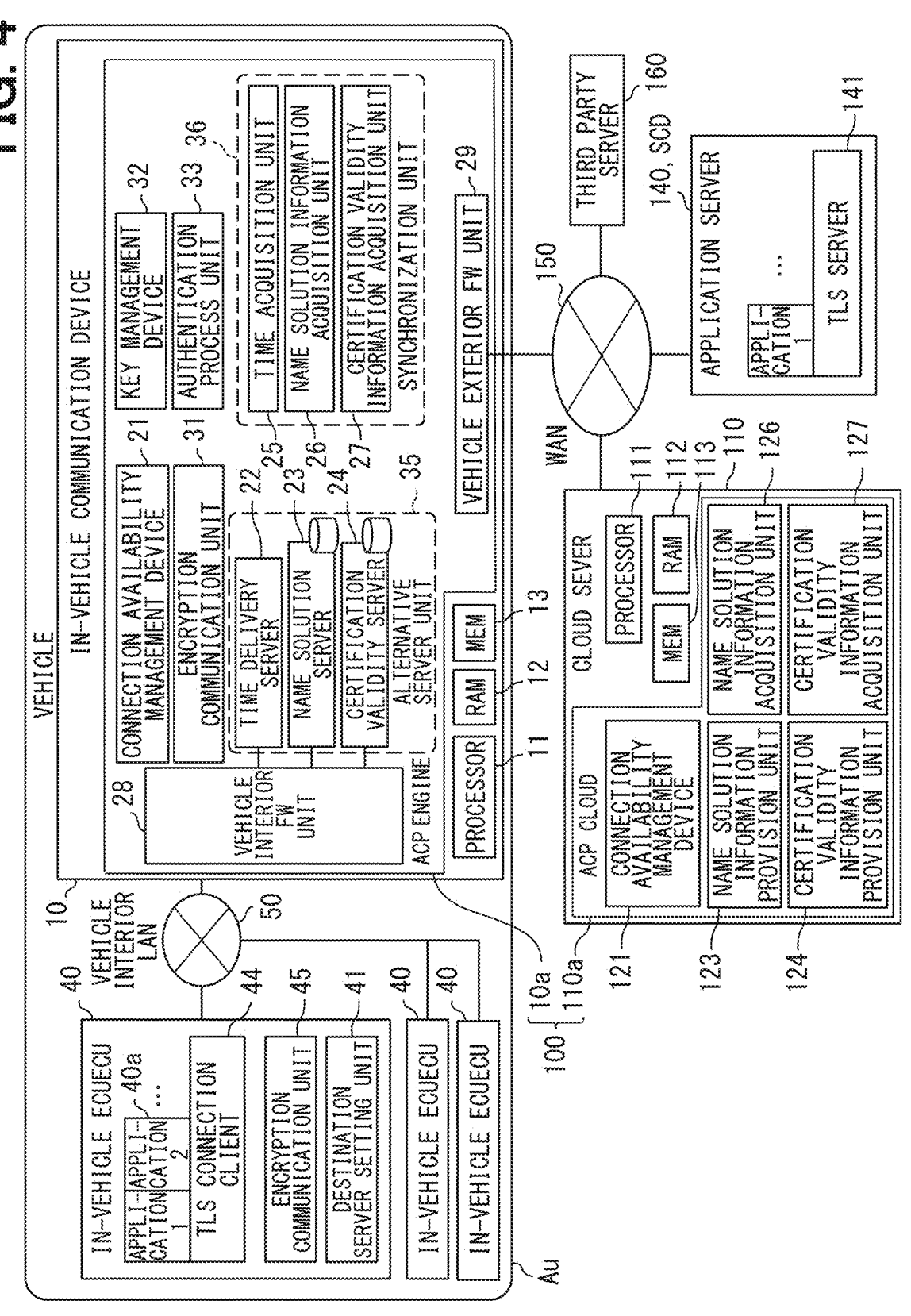
FIG. 4 is a diagram showing an overview of a communication process system according to a second embodiment of the present disclosure.
Figure 5:
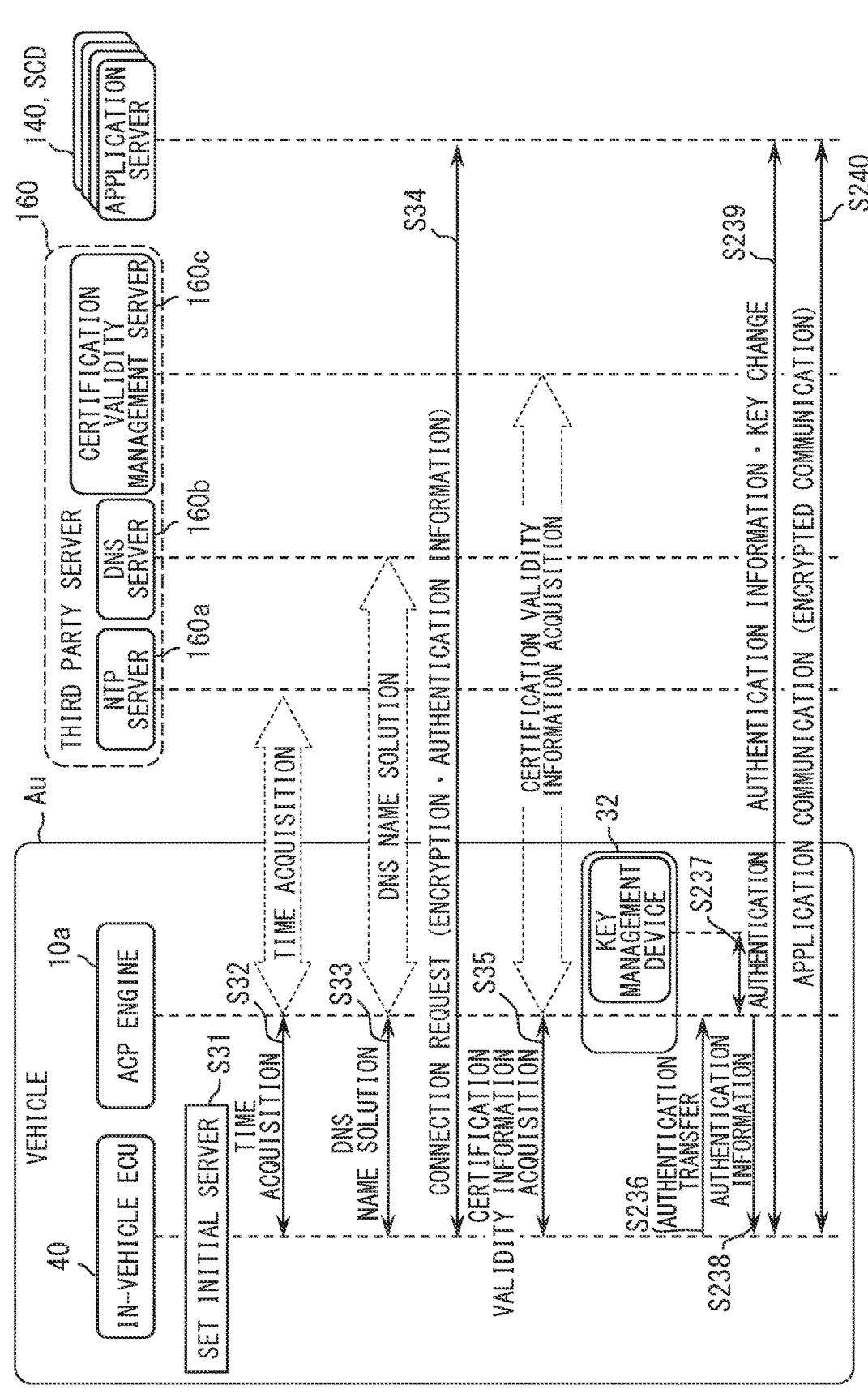
FIG. 5 is a sequence diagram showing details of a connection process according to the second embodiment.

A second embodiment of the present disclosure illustrated in FIGS. 4 and 5 is a modification of the first embodiment. In a communication process system of the second embodiment, the proxy unit 128 is omitted from the ACP cloud 110*a*. In addition, in the second embodiment, the authentication process by the in-vehicle ECU 40 is executed by the ACP engine 10*a*. Hereinafter, details of the ACP engine 10*a* and the in-vehicle ECU 40 in the second embodiment, and details of the synchronization process and the connection process (see FIG. 5) will be described in order.

The ACP engine 10*a* has an encryption communication unit 31, a key management device 32 and an authentication process unit 33. The encryption communication unit 31 encrypts the vehicle interior communication through the vehicle interior LAN 50. The encryption communication unit 31 can perform inter-ECU encryption communication with an encryption communication unit 45 of the in-vehicle ECU 40.

The key management device 32 has substantially the same configuration as the key management device 42 (see FIG. 1) of the first embodiment. The key management device 32 stores key information used for authentication of the specific connection destination SCD. The key management device 32 is provided in the in-vehicle communication device 10 as a configuration (Hardware Security Module, HSM) that is a hardware configuration independent from other circuit units. By a process of providing a random number from the outside and returning secret key information stored inside and a calculation result to the outside, the key management device 32 can execute the authentication process with signature verification and signature addition without outputting key information to the outside of the device.

The authentication process unit 33 authenticates the application server 140 with which the in-vehicle ECU 40 communicates based on authentication transfer from the in-vehicle ECU 40. The authentication process unit 33 can execute the authentication process of the application server 140 using existing calculation resources installed in the in-vehicle communication device 10. In FIG. 4, illustration of the information preparation unit 21*a* (see FIG. 1) and the permission setting unit 21*b* (see FIG. 1) is omitted.

The in-vehicle ECU 40 has the encryption communication unit 45 instead of the key management device 42 (see FIG. 1). Omission of the key management device 42 simplifies the configuration of the in-vehicle ECU 40. The encryption communication unit 45 enables encrypted communication between the ACP engine 10*a* and the in-vehicle ECU 40 in cooperation with the encryption communication unit 31 of the ACP engine 10*a*. The encryption communication unit 45 acquires the authentication information based on the result of the calculation performed by the authentication process unit 33 from the in-vehicle ECU 40 through encrypted vehicle interior communication.

Here, in the second embodiment, the authentication process is transferred from the in-vehicle ECU 40 to the in-vehicle communication device 10. Therefore, when the authentication information is stolen by a malicious person, unauthorized communication for disguising as a qualified client is possible. As a countermeasure against such eavesdropping, it is necessary to encrypt communication between the in-vehicle ECU 40 and the ACP engine 10*a*. In one example, the encryption communication units 31 and 45 perform encrypted communication equivalent to unlocking the doors of the vehicle Au, or the like, to protect the authentication information.

A synchronization process of the second embodiment (see FIG. 2) is substantially the same as that of the first embodiment as a whole. In the second embodiment, the specific connection destination SCD of the in-vehicle ECU 40 is the application server 140, so the ACP engine 10*a* acquires, as the name solution information, the IP address of the application server 140 in the connection information preparation process (see S16 to S18 in FIG. 2). Further, the filtering setting of the vehicle exterior FW unit 29 is changed to the setting that allows the connection from the in-vehicle ECU 40 to the application server 140 to pass based on the name solution information (see S19 in FIG. 2).

In the connection process of the second embodiment, the processes of S31 to S35 are substantially the same as those of the first embodiment. However, in S34, TLS negotiation is performed between the in-vehicle ECU 40 and the application server 140. Also in the second embodiment, the connection information is provided to the in-vehicle ECU 40 from the alternative server unit 35 of the ACP engine 10a. Thereby, vehicle exterior access from the ACP engine 10a to the third party server 160 is eliminated.

In S236, the in-vehicle ECU 40 transfers and requests authentication processing to the ACP engine 10a. Communication related to transfer and request of the authentication process is encrypted by each of the encryption communication units 31 and 45.

In S237, an authentication process using the key information managed by the key management device 32 is executed by the authentication process unit 33 of the ACP engine 10a. In S237, processes for signatures for server authentication processing and client authentication processing are executed.

In S238, the ACP engine 10a provides the authentication information obtained in S237 to the in-vehicle ECU 40, which is the source of the authentication process request. The transmission of the authentication information in S238 is encrypted by each of the encryption communication units 31 and 45.

In S239, the authentication information received from the ACP engine 10a is passed from the in-vehicle ECU 40 to the application server 140. Additionally, a public key exchange is performed. Thereby, authentication by the application server 140 is completed, and TLS is established between the in-vehicle ECU 40 and the application server 140. As a result, encrypted application communication starts in S240.

In the second embodiment described above, since the connection information prepared by the ACP engine 10a is provided to the in-vehicle ECU 40, the vehicle exterior communication from the in-vehicle ECU 40 to the third party server 160 and placement of the proxy ECU in the vehicle can be omitted. Therefore, the same effects as in the first embodiment can be obtained, and it is possible to obtain both network performance and security standard.

In addition, in the second embodiment, the specific connection destination SCD is authenticated using key information managed by the key management device 32, and authentication information based on the authentication result is provided to the in-vehicle ECU 40. When the authentication is transferred from the in-vehicle ECU 40 to the ACP engine 10a in this manner, the key management device 42 (see FIG. 1) of each in-vehicle ECU 40 becomes unnecessary. HSMs that serve as the key management devices 32 and 42 require a base for managing and operating key information, and operations such as registration and disposal are difficult. Therefore, the cost becomes high. Therefore, the total security cost required for the in-vehicle system is reduced by the centralization of the key management device 32. Further, by transferring the authentication process with heavy calculation such as, for example, asymmetric key encryption or encryption with a long bit length, to the ACP engine 10a when the in-vehicle ECU 40 has a low calculation performance, it is possible to ensure a secure connection standard equivalent to that of the ACP engine 10a. In the second embodiment, the key management device 32 corresponds to a "key management unit".

Third Embodiment

Figure 6:
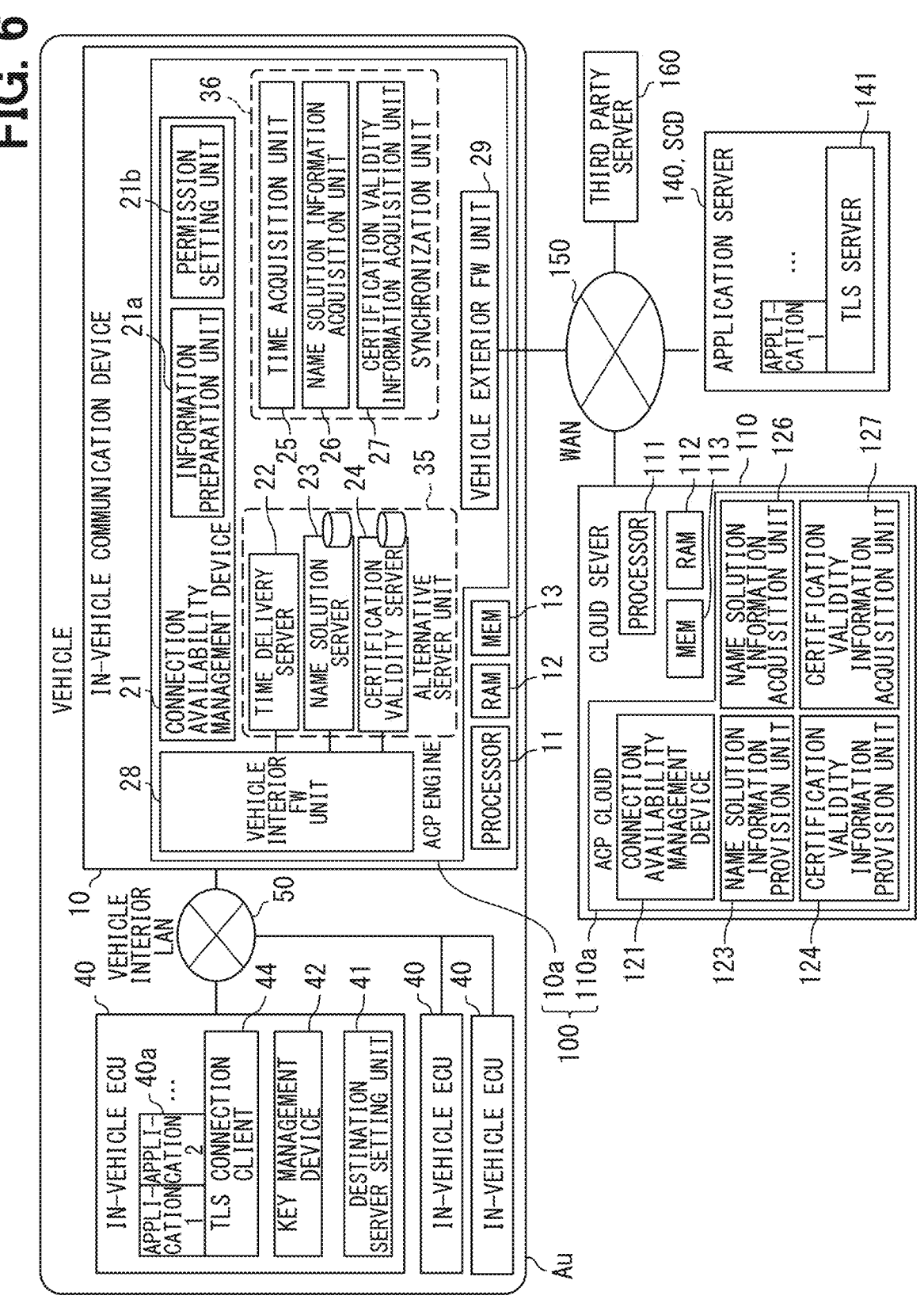
FIG. 6 is a diagram showing an overview of a communication process system according to a third embodiment of the present disclosure.

A third embodiment of the present disclosure illustrated in FIGS. 6 and 7 is another modification of the first embodiment. In the third embodiment, the specific connection destination SCD of the in-vehicle ECU 40 is set to the application server 140 as in the second embodiment. Thereby, TLS negotiation is performed between the in-vehicle ECU 40 and the application server 140 in S34 of the connection process. Further, in S36, mutual authentication between the in-vehicle ECU 40 and the application server 140 is performed. Then, in S37, authentication information and key information are exchanged between the in-vehicle ECU 40 and the application server 140. Thereby, authentication by the application server 140 is completed, and the TLS is established between the in-vehicle ECU 40 and the application server 140, and encrypted application communication starts in S38.

Also in the third embodiment described above, the connection information prepared by the ACP engine 10a is provided to the in-vehicle ECU 40, so the vehicle exterior communication from the in-vehicle ECU 40 to the third party server 160 can be omitted. Therefore, the same effects as in the first embodiment can be obtained, and it is possible to obtain both network performance and security standard.

Fourth Embodiment

Figure 8:
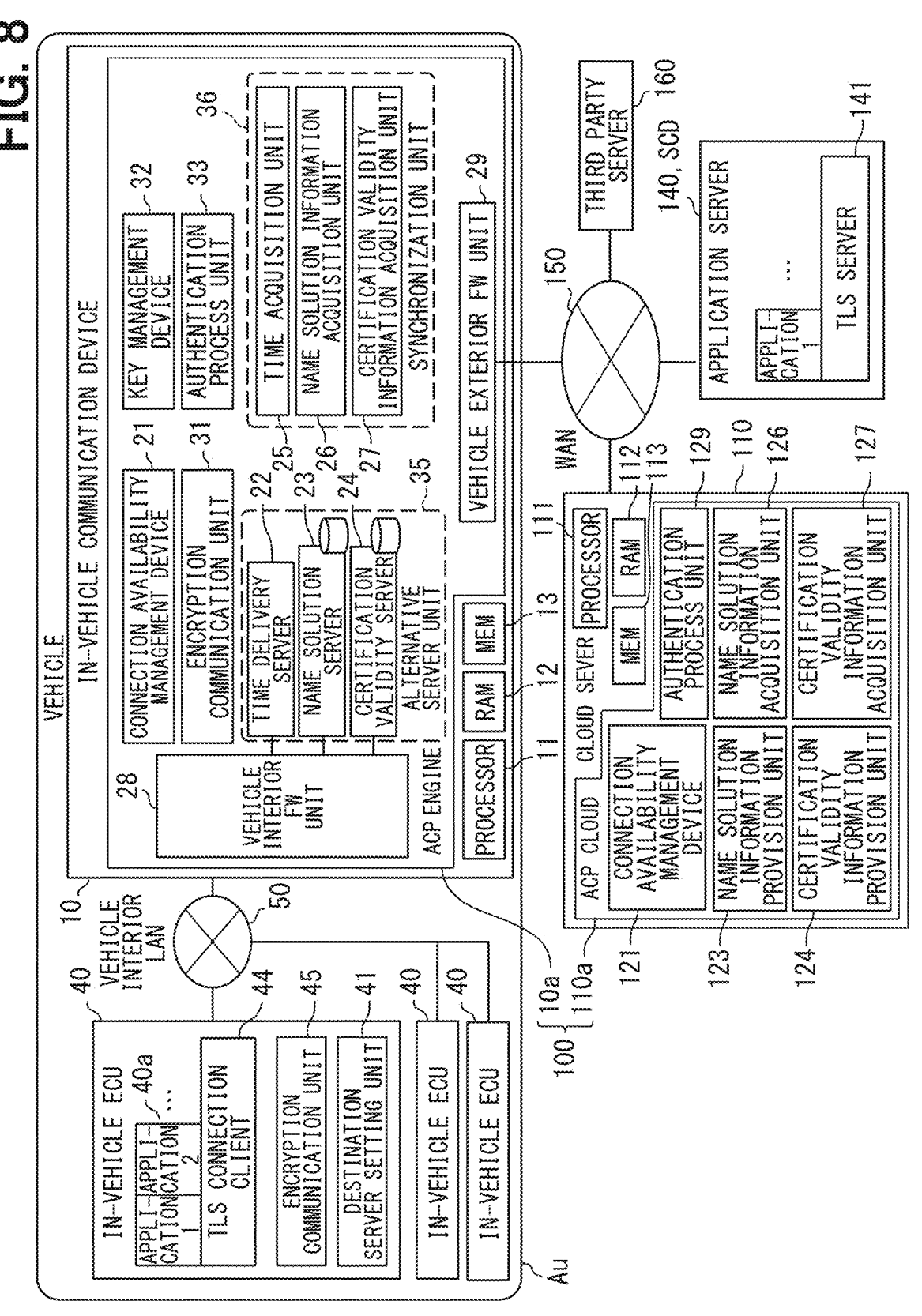
FIG. 8 is a diagram showing an overview of a communication process system according to a fourth embodiment of the present disclosure.
Figure 9:
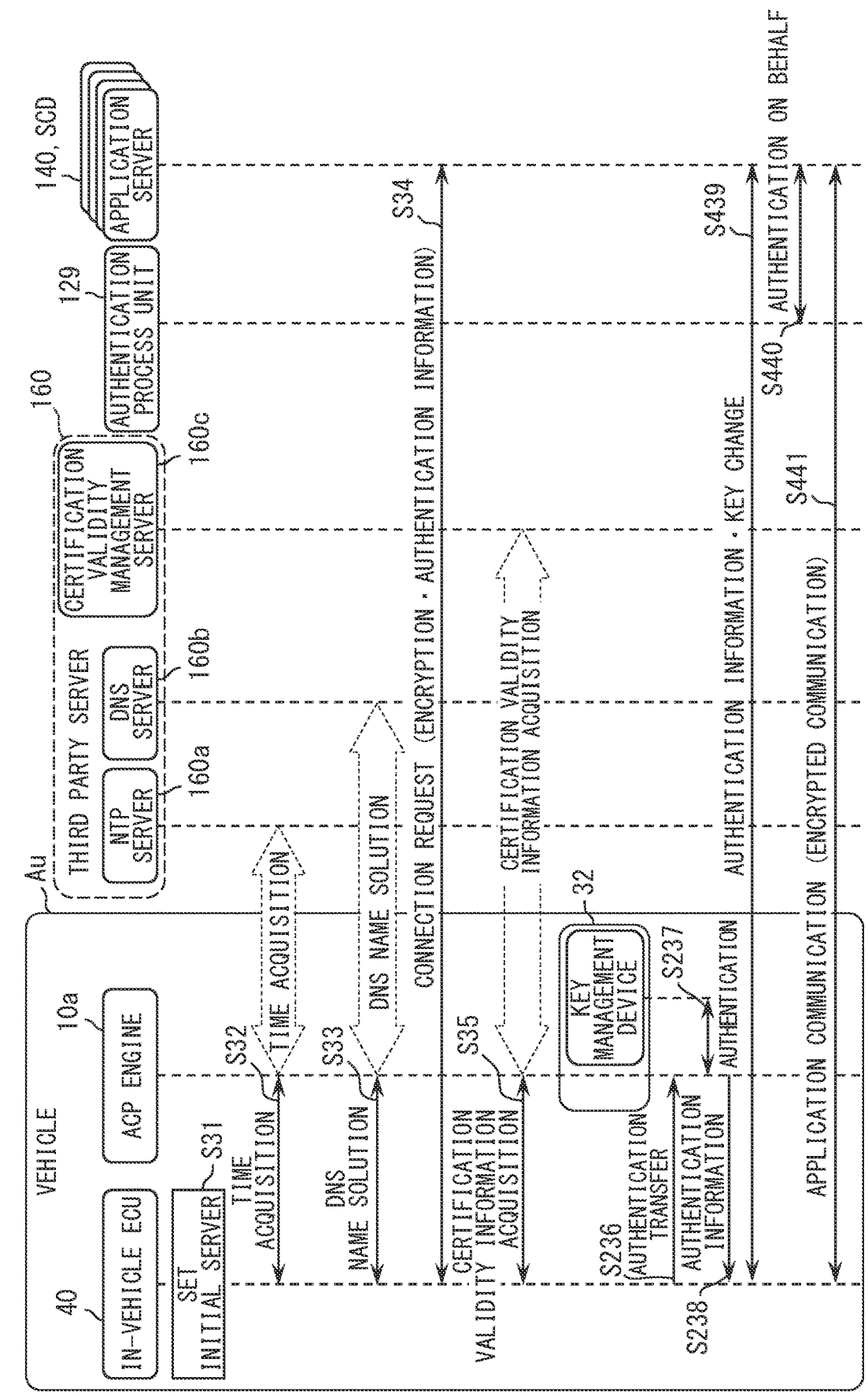
FIG. 9 is a sequence diagram showing details of a connection process according to the fourth embodiment.

A fourth embodiment of the present disclosure illustrated in FIGS. 8 and 9 is a modification of the second embodiment. The ACP cloud 110a of the fourth embodiment has an authentication process unit 129. The authentication process unit 129 authenticates the in-vehicle ECU 40 accessing the application server 140 instead of application server 140. Hereinafter, details of the connection process of the fourth embodiment will be described. Processes of S31 to S35 and S236 to S238 of the synchronization process of the fourth embodiment are substantially the same as those of the first and second embodiments.

In S439 of the connection process, the in-vehicle ECU 40 communicates with the application server 140. In S439, the in-vehicle ECU 40 and the application server 140 exchange authentication information and key information.

In S440, the application server 140 requests the authentication process unit 129 to execute authentication process on behalf of the application server 140. Specifically, in S440, the authentication process is transferred or requested from the application server 140 to the authentication process unit 129. Based on the request from the application server 140, the authentication process unit 129 uses authentication information transmitted to the application server 140 to execute the authentication process of the in-vehicle ECU 40. The authentication process unit 129 provides authentication information to the application server 140 that is the request source. In S441, the TLS between the application server 140 and the in-vehicle ECU 40 is constructed based on the authentication information acquired in S440. Thereby, the encrypted application communication starts.

Also in the fourth embodiment described above, the connection information prepared by the ACP engine 10a is provided to the in-vehicle ECU 40, so the vehicle exterior communication from the in-vehicle ECU 40 to the third party server 160 can be omitted. Therefore, the same effects as in the second embodiment can be obtained, and it is possible to obtain both network performance and security standard.

Additionally, in the fourth embodiment, the authentication process unit 129 authenticates the in-vehicle ECU 40 instead of the application server 140. Therefore, it becomes unnecessary to pass authentication information and specification information for authenticating whether the in-vehicle ECU 40 is correct to a large number of application servers 140. As a result, it becomes easier to ensure the security standard of the access from the in-vehicle ECU 40 to the application server 140.

Other Embodiments

Although multiple embodiments of the present disclosure have been described above, the present disclosure is not construed as being limited to the above-described embodiments, and can be applied to various embodiments and combinations within a range that does not depart from the spirit of the present disclosure.

In the communication control system according to the first embodiment described above, by setting the specific connection destination SCD to the proxy unit 128, it is possible to eliminate communication bottlenecks. Therefore, for example, only a specific in-vehicle ECU 40 with a relatively high security risk, such as a control-system in-vehicle ECU 40, may be connected to the proxy unit 128. Such a first embodiment is an embodiment assuming a use case that does not require a guarantee for extremely low delay.

In the second embodiment described above, since the authentication process is integrated into the ACP engine 10*a*, it is possible to reduce the total cost of security countermeasures, and ensure the security standard even in the in-vehicle ECU 40 that mainly uses a low-performance processor. Therefore, the second embodiment is suitable for a use case in which the in-vehicle ECU 40 with a relatively high security risk or the in-vehicle ECU 40 mainly including a low-performance processor performs the vehicle exterior communication.

The third embodiment described above can reduce the number of changes from the configuration of the comparative example described above. Therefore, the third embodiment is suitable for a use case in which the in-vehicle ECU 40 having a relatively high security risk performs the vehicle exterior communication.

In the fourth embodiment described above, it becomes unnecessary to provide a mechanism and function for authenticating the vehicle Au to a server developer or the like and many servers. Also, the fourth embodiment is suitable for a use case such as remote control that requires very low delay guarantees. In one example, a TLS terminal server (corresponding to an application server) can be placed in a cellular core network called mobile edge computing, and it is possible to achieve low delay connection. With such a system configuration, it is possible to achieve low delay because it does not go out to the Internet. On the other hand, it is necessary to install a server for each area that constitutes the core network, and it is under the jurisdiction of a core network operator (infrastructure operator). Security management of the vehicle Au becomes difficult because it is assumed to be shared with other users. The communication control system of the present disclosure is also suitable for such networks.

In a first modification of the above embodiment, an expiration date is set in the connection information provided from the ACP cloud 110*a* to the ACP engine 10*a*. The ACP cloud 110*a* invalidates the connection information provided to the ACP engine 10*a* when the connection information is not referred by the expiration date. For example, the expiration date is set in consideration of the date and time when a rental car will be returned. The cloud server 110 connected to the terminal having the above functions individually manages and updates connection information permitted for each of the vehicle Au, the in-vehicle ECU 40, and the application 40*a*.

In a second modification of the above embodiment, also the ACP engine 10*a* does not access the third party server 160 when providing connection information from the ACP engine 10*a* to the in-vehicle ECU 40. In S16, the ACP engine 10*a* acquires the connection information to the in-vehicle ECU 40 from all the ACP clouds 110*a*.

In the above embodiment, a DNS packet for querying the third party server 160 contains a domain name of the connection destination of the in-vehicle ECU 40 in plain text. Therefore, even when the vehicle exterior communication from the vehicle Au is intercepted, there is a risk that the domain name accessed by this vehicle Au will be specified. Therefore, in a third modification of the above-described embodiment, the above exchange is performed on the encrypted communication path between the ACP engine 10*a* and the ACP cloud 110*a*. Thereby, it becomes difficult to intercept the connection destination of the in-vehicle ECU 40 from outside the vehicle. The cloud server 110 connected to a terminal having such functions accesses the third party server 160. As a result, without change or update of the in-vehicle ECU 40, it is possible to provide the system that can immediately follow changes in the specification of the third party server 160 and changes in and additions to the authentication method in line with the evolution of the times including security measures.

In a fourth modification of the above embodiment, the alternative server unit 35 is omitted from the ACP engine 10*a*. The ACP engine 10*a* of the first modification sequentially acquires connection information from the third party server 160 or the ACP cloud 110*a* based on a request from the in-vehicle ECU 40.

In a fifth modification of the above embodiment, the ACP engine 10*a* acquires connection information from the third party server 160 and sets it in the alternative server unit 35. That is, in the ACP cloud 110*a*, the function of providing connection information by the connection availability management unit 121 is omitted. In such a fifth modification, the connection availability management unit 121 that sets the specific connection destination SCD for each in-vehicle ECU 40 is also omitted.

As described above, the key management device of the above embodiment may have a form in which the IC itself is separated from other hardware, a form in which the same IC is separated from other hardware parts, or the like. Further, the key management device may have a form of separate software such as authority management and signatures.

In the above embodiment and modifications, the respective functions provided by the in-vehicle communication device 10 and the cloud server 110 can be also provided by software and hardware for executing the software, only software, only hardware, and complex combinations of software and hardware. Further, in a case where these functions are provided by electronic circuits as hardware, the functions can be also provided by analog circuits or digital circuits which include a large number of logic circuits.

In the above embodiments, each of the processors 11 and 111 is hardware used for calculation processing and coupled with the RAMs 12 and 112, respectively, and is the main configuration of a computer that implements the information transmission method according to the present disclosure. Each of the processors 11 and 111 includes at least one calculation core such as a central processing unit (CPU). A processing circuit including the processors 11 and 111 may mainly include FPGA (Field Programmable Gate Array) or ASIC (Application Specific Integrated Circuit).

The storage media 13 and 113 include non-volatile storage media. Each storage medium 13, 113 stores various programs (communication control programs) respectively executed by processors 11, 111 to implement the above communication control method. The forms of such storage media 13 and 113 may be appropriately changed. For example, the storage media 13 and 113 are not limited to the configurations provided on the circuit board, and may be provided in the form of a memory card or the like. The storage media may be inserted into a slot portion, and electrically connected to the processing circuits of the in-vehicle communication device 10 and the cloud server 110. Further, the storage media 13 and 113 may be optical discs, hard disk drives, or the like, which serve as copy sources for the programs.

The controllers and methods thereof described in the present disclosure may be implemented by a special purpose computer which includes a processor programmed to execute one or more functions implemented by computer programs. Alternatively, the device and method described in the present disclosure may be implemented by a special purpose hardware logic circuit. Alternatively, the device and the method described in the present disclosure may be implemented by one or more special purpose computers configured by a combination of a processor executing a computer program and one or more hardware logic circuits. The computer program may be stored in a computer readable non-transitory tangible storage medium as computer-executable instructions.

Here, the process of the flowchart or the flowchart described in this application includes a plurality of sections (or steps), and each section is expressed as, for example, S11. Further, each section may be divided into several subsections, while several sections may be combined into one section. Furthermore, each section thus configured may be referred to as a device, module, or means.

The invention claimed is:

1. A communication control method that is used for controlling a vehicle exterior communication performed between a first in-vehicle electronic control unit and an outside of a vehicle and is executed by at least one processor, the method comprising:

preparing connection information necessary for the vehicle exterior communication between the first in-vehicle electronic control unit and a specific connection destination on behalf of the first in-vehicle electronic control unit; and permitting the first in-vehicle electronic control unit to perform the vehicle exterior communication limited to the specific connection destination using the connection information, wherein when preparing the connection information, performing setting of the first in-vehicle electronic control unit to acquire by the first in-vehicle electronic control unit, the connection information acquired by the vehicle exterior communication from an alternative server unit configured to provide the connection information to the first in-vehicle electronic control unit through a vehicle interior communication, the setting of the first in-vehicle electronic control unit includes setting the vehicle exterior communication of the first in-vehicle electronic control unit to only the specific connection destination, after the vehicle exterior communication of the first in-vehicle electronic control unit is set to only the specific connection destination, the first in-vehicle electronic control unit performs mutual communication with the specific connection destination to construct an encrypted communication path, and, in the vehicle, a second in-vehicle electronic control unit does not grasp a communication content of encryption communication via the constructed encrypted communication path, and the specific connection destination is a server that provides a service to a user of the vehicle, the service is provided by execution of an application communication between the first in-vehicle electronic control unit and the specific connection destination, and the communication content of the encryption communication is related to the service.

2. The communication control method according to claim 1, further comprising when preparing the connection information, acquiring the connection information managed by a preset connection management unit through the vehicle exterior communication with the communication management unit.

3. The communication control method according to claim 2, further comprising:

acquiring, from the connection management unit, designation information for designating the specific connection destination linked to the first in-vehicle electronic control unit; and when permitting the vehicle exterior communication, permitting the first in-vehicle electronic control unit to perform the vehicle exterior communication with the specific connection destination indicated by the designation information.

4. The communication control method according to claim 1, further comprising:

authenticating the specific connection destination using key information managed by a key management unit; and providing authentication information based on an authentication result of the specific connection destination to the first in-vehicle electronic control unit.

5. The communication control method according to claim 1, further comprising when permitting the vehicle exterior communication, setting, to the specific connection destination, a proxy unit configured to relay the vehicle exterior communication.

6. The communication control method according to claim 1, further comprising on behalf of the specific connection destination, causing an authentication process unit to authenticate the first in-vehicle electronic control unit that accesses the specific connection destination.

7. The communication control method according to claim 1, wherein the connection information is an IP address that is linked to the first in-vehicle electronic control unit and specifies the specific connection destination outside the vehicle.

8. The communication control method according to claim 1, wherein the at least one processor of the vehicle serves as a vehicle exterior firewall unit configured to determine whether different vehicle exterior communication between the at least one processor and the outside of the vehicle is illegal, and the different vehicle exterior communication is performed via the vehicle exterior firewall unit.

9. The communication control method according to claim 1, wherein the second in-vehicle electronic control unit is a non-gateway electronic control unit that is unable to establish communication outside of the vehicle.

10. A communication control device for controlling a vehicle exterior communication performed between a first in-vehicle electronic control unit and an outside of a vehicle, the device comprising at least one of (i) a circuit and (ii) a processor with a memory storing computer program code executable by the processor, the at least one of the circuit and the processor configured to cause the device to serve as:

an information preparation unit configured to prepare connection information necessary for the vehicle exterior communication between the first in-vehicle electronic control unit and a specific connection destination on behalf of the first in-vehicle electronic control unit; and a permission setting unit configured to permit the first in-vehicle electronic control unit to perform the vehicle exterior communication limited to the specific connection destination using the connection information, wherein when preparing the connection information, performing setting of the first in-vehicle electronic control unit to acquire by the first in-vehicle electronic control unit, the connection information acquired by the vehicle exterior communication from an alternative server unit configured to provide the connection information to the first in-vehicle electronic control unit through a vehicle interior communication, the setting of the first in-vehicle electronic control unit includes setting the vehicle exterior communication of the first in-vehicle electronic control unit to only the specific connection destination, after the vehicle exterior communication of the first in-vehicle electronic control unit is set to only the specific connection destination, the first in-vehicle electronic control unit performs mutual communication with the specific connection destination to construct an encrypted communication path, and, in the vehicle, a second in-vehicle electronic control unit does not grasp a communication content of encryption communication via the constructed encrypted communication path, and the specific connection destination is a server that provides a service to a user of the vehicle, the service is provided by execution of an application communication between the first in-vehicle electronic control unit and the specific connection destination, and the communication content of the encryption communication is related to the service.

11. The communication control device according to claim 10, wherein the processor serves as the information preparation unit and the permission setting unit.

12. The communication control device according to claim 10, wherein the connection information is an IP address that is linked to the first in-vehicle electronic control unit and specifies the specific connection destination outside the vehicle.

13. The communication control device according to claim 10, wherein the second in-vehicle electronic control unit is a non-gateway electronic control unit that is unable to establish communication outside of the vehicle.

* * * * *